United States Patent
Maruyama et al.

(10) Patent No.: US 8,576,902 B2
(45) Date of Patent: Nov. 5, 2013

(54) RECEIVING DEVICE AND METHOD, DEMODULATING DEVICE AND METHOD, AND PROGRAM

(75) Inventors: Hirofumi Maruyama, Tokyo (JP); Ryo Hasegawa, Tokyo (JP); Katsumi Takaoka, Chiba (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 13/235,854

(22) Filed: Sep. 19, 2011

(65) Prior Publication Data
US 2012/0099634 A1    Apr. 26, 2012

(30) Foreign Application Priority Data
Oct. 25, 2010    (JP) .................. 2010-238638

(51) Int. Cl.
- *H04B 3/46* (2006.01)
- *H04B 17/00* (2006.01)
- *H04Q 1/20* (2006.01)

(52) U.S. Cl.
USPC ........... 375/227; 375/346; 375/343; 375/284; 375/285; 455/63.1; 455/226.3; 455/296

(58) Field of Classification Search
USPC ......... 375/227, 346, 343, 284, 285; 455/63.1, 455/226.3, 296
See application file for complete search history.

(56) References Cited

U.S. PATENT DOCUMENTS

| | | | |
|---|---|---|---|
| 6,292,519 B1 * | 9/2001 | Popovic | 375/346 |
| 2005/0281358 A1 * | 12/2005 | Bottomley et al. | 375/343 |

FOREIGN PATENT DOCUMENTS

JP    2007-208748    8/2007

OTHER PUBLICATIONS

U.S. Appl. No. 13/235,806, filed Sep. 19, 2011, Hasefawa, et al.
U.S. Appl. No. 13/235,885, filed Sep. 19, 2011, Hasefawa, et al.
U.S. Appl. No. 13/370,837, filed Feb. 10, 2012, Hasegawa, et al.

* cited by examiner

*Primary Examiner* — Phuong Phu
(74) *Attorney, Agent, or Firm* — Sony Corporation

(57) ABSTRACT

The present disclosure provides a receiving device including, a receiver configured to receive a signal that is transmitted via a propagation path and is modulated by a predetermined system prescribed by a predetermined standard, a demodulator configured to demodulate a received signal, an estimator configured to estimate a signal-to-noise ratio relating to the propagation path, obtained from a data signal included in the demodulated received signal, and a corrector configured to correct an estimated signal-to-noise ratio in accordance with a transmission parameter obtained from the received signal.

16 Claims, 9 Drawing Sheets

TRANSMISSION POINT = ESTIMATED TRANSMISSION POINT

FIG.3B

TRANSMISSION POINT ≠ ESTIMATED TRANSMISSION POINT

RECEIVING DEVICE AND METHOD, DEMODULATING DEVICE AND METHOD, AND PROGRAM

BACKGROUND

The present disclosure relates to receiving devices and methods, demodulating devices and methods, and programs, and particularly to receiving device and method, demodulating device and method, and program that enable enhancement in the accuracy of estimation of the SNR (Signal-to-Noise Ratio) relating to a propagation path.

Figure 1:
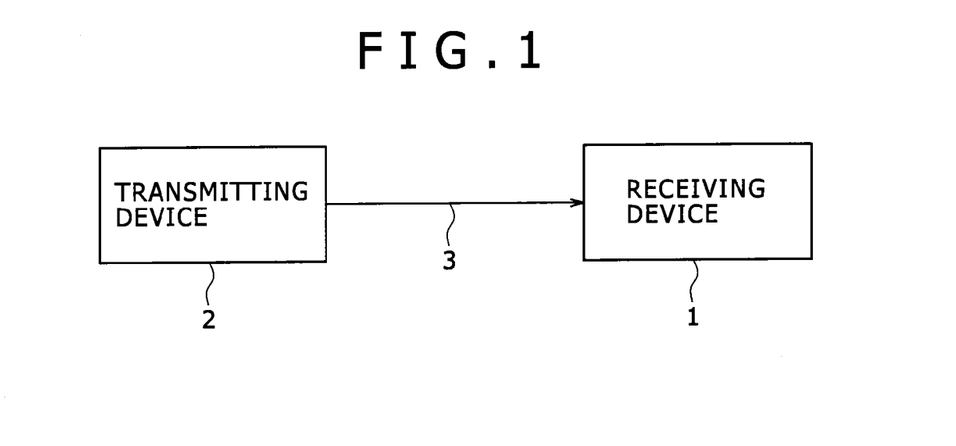
FIG. 1 is a diagram showing the outline of a path SNR.

As shown in FIG. 1, a digital terrestrial broadcast signal transmitted from a transmitting device 2 of a broadcast station or the like is received by a receiving device 1 via a propagation path 3. In the digital terrestrial broadcasting and so forth, e.g. OFDM (Orthogonal Frequency Division Multiplexing) is employed as the digital modulation system for data (signal).

The propagation path 3 gives the influence of noise and so forth to the signal transmitted from the transmitting device 2. In general, the influence given to the signal by the propagation path 3 is represented by the SNR.

In the receiving device 1, the path SNR of the propagation path 3, obtained from the signal transmitted from the transmitting device 2 via the propagation path 3, is estimated. Hereinafter, the estimated path SNR will be referred to as the estimated SNR.

Figure 2:
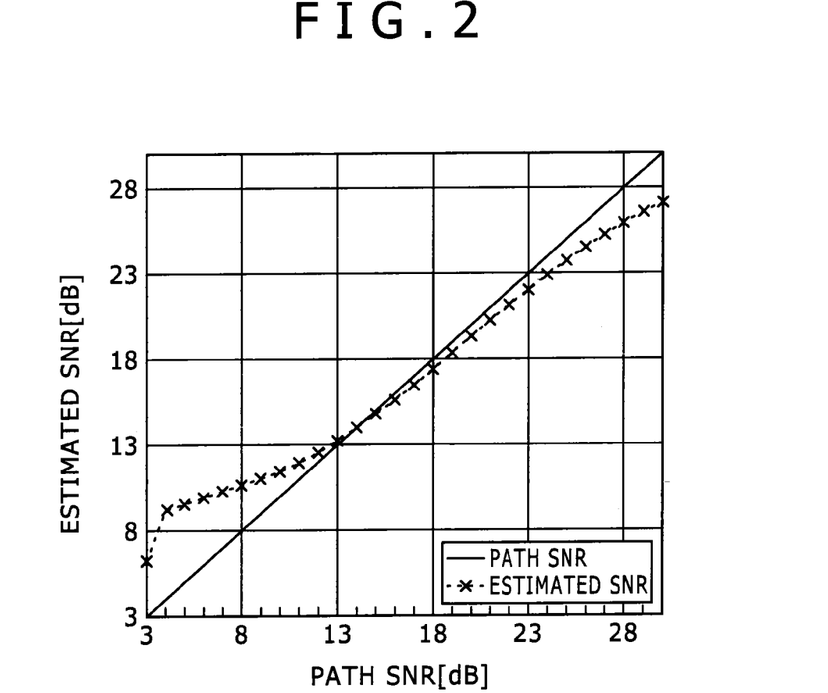
FIG. 2 is a diagram showing the relationship between the path SNR and an estimated SNR.

FIG. 2 is a diagram showing the relationship between the ideal path SNR and the estimated SNR.

In FIG. 2, the estimated SNR represented by the axis along the vertical direction in the diagram is indicated by the dashed line, and the path SNR represented by the axis along the horizontal direction in the diagram is indicated by the solid line. As shown in FIG. 2, as the relationship between the estimated SNR (dashed line) and the path SNR (solid line), the value of the estimated SNR is closer to the value of the path SNR when the value of the SNR is larger. In contrast, the value of the estimated SNR is divergent from the value of the path SNR at a higher degree when the value of the SNR is lower.

Figure 3A:
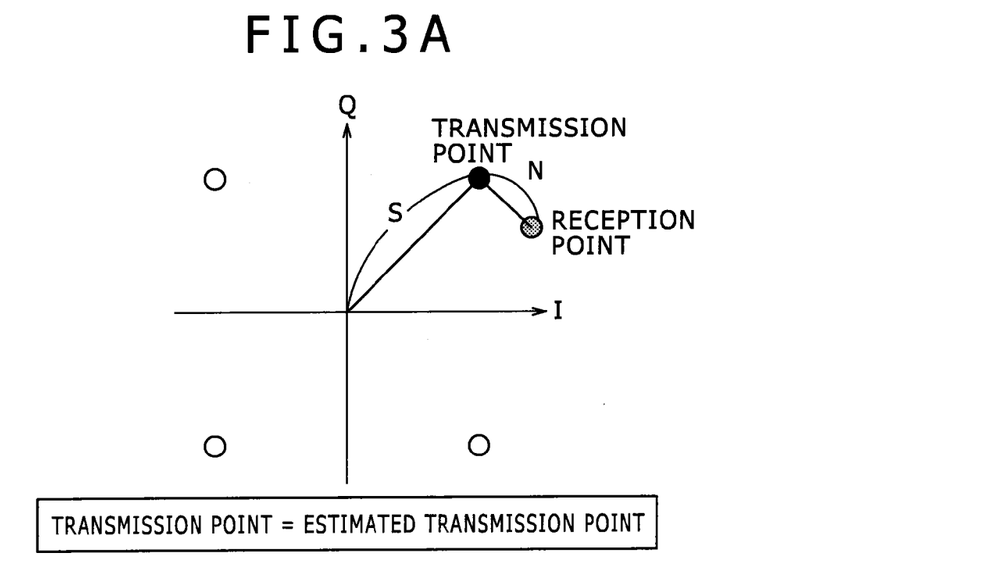
FIGS. 3A and 3B are diagrams showing a result of a hard decision for the constellation of a data signal.

The reason for the occurrence of such divergence will be described with reference to FIGS. 3A and 3B.

In the case of obtaining the estimated SNR from an unknown data signal included in a signal transmitted via the propagation path 3, generally the result of a hard decision for the constellation of the data signal is utilized. Specifically, when the path SNR is not low, the transmission point corresponds with the estimated transmission point in the constellation in the IQ plane as shown in pattern A of FIG. 3A, so that the ideal estimated SNR is obtained. In this case, the correct estimated SNR is obtained based on S and N indicated by the solid lines.

Figure 3B:
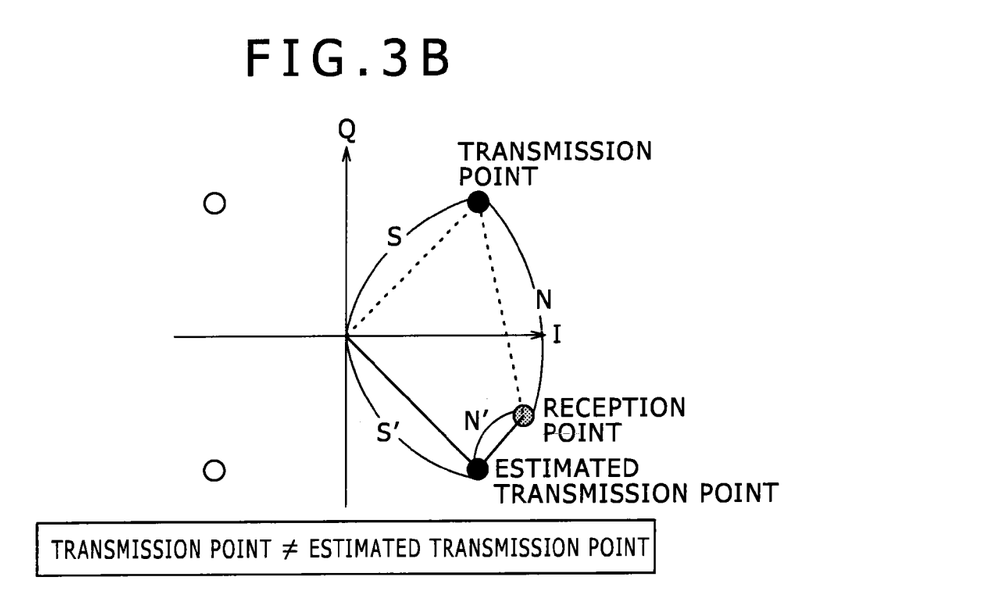

In contrast, as shown in pattern B of FIG. 3B, when the path SNR is low, the result of a hard decision is mistaken for an adjacent symbol and the transmission point does not correspond with the estimated transmission point. As a result, an erroneous estimated SNR is obtained. In this case, although the correct estimated SNR is obtained based on S and N indicated by the dashed lines, actually the erroneous estimated SNR is obtained by S' and N' indicated by the solid lines.

As a method for calculating the SNR, there has been disclosed an OFDM demodulating device that calculates the SNR based on a complex correlation signal obtained by complex correlation calculation of a baseband signal (refer to e.g. Japanese Patent Laid-open No. 2007-208748).

SUMMARY

As described above, the following problem exists in the case of obtaining the estimated SNR from an unknown data signal. Specifically, in general, when the value of the SNR is low, the transmission point does not correspond with the estimated transmission point and thus an erroneous SNR is obtained, so that the value of the estimated SNR is divergent from the value of the path SNR.

This estimated SNR is not only provided to the respective sections in the receiving device to be used for predetermined processing but also used when information relating to the path SNR is notified to the user for example. Therefore, there has been a demand to obtain the estimated SNR with high accuracy.

There is a need for a technique to enable enhancement in the accuracy of estimation of the SNR relating to a propagation path.

According to an embodiment of the present disclosure, there is provided a receiving device including a receiver configured to receive a signal that is transmitted via a propagation path and is modulated by a predetermined system prescribed by a predetermined standard, a demodulator configured to demodulate a received signal, an estimator configured to estimate an SNR relating to the propagation path, obtained from a data signal included in the demodulated received signal, and a corrector configured to correct an estimated SNR in accordance with a transmission parameter obtained from the received signal.

According to another embodiment of the present disclosure, there is provided a receiving method of a receiving device. The method includes receiving a signal that is transmitted via a propagation path and is modulated by a predetermined system prescribed by a predetermined standard, demodulating the received signal, estimating an SNR relating to the propagation path, obtained from a data signal included in the demodulated received signal, and correcting an estimated SNR in accordance with a transmission parameter obtained from the received signal.

According to another embodiment of the present disclosure, there is provided a program for causing a computer to function as a device including a receiver configured to receive a signal that is transmitted via a propagation path and is modulated by a predetermined system prescribed by a predetermined standard, a demodulator configured to demodulate a received signal, an estimator configured to estimate an SNR relating to the propagation path, obtained from a data signal included in the demodulated received signal, and a corrector configured to correct an estimated SNR in accordance with a transmission parameter obtained from the received signal.

In the receiving device and method and the program according to the above-described embodiments of the present disclosure, a signal that is transmitted via the propagation path and is modulated by a predetermined system prescribed by a predetermined standard is received and the received signal is demodulated. Furthermore, the SNR relating to the propagation path, obtained from a data signal included in the demodulated received signal, is estimated, and the estimated SNR is corrected in accordance with the transmission parameter obtained from the received signal.

According to another embodiment of the present disclosure, there is provided a demodulating device including a demodulator configured to demodulate a received signal that is transmitted via a propagation path and is modulated by a predetermined system prescribed by a predetermined standard, an estimator configured to estimate an SNR relating to the propagation path, obtained from a data signal included in the demodulated received signal, and a corrector configured to correct an estimated SNR in accordance with a transmission parameter obtained from the received signal.

According to another embodiment of the present disclosure, there is provided a demodulating method of a demodulating device. The method includes demodulating a received signal that is transmitted via a propagation path and is modulated by a predetermined system prescribed by a predetermined standard, estimating an SNR relating to the propagation path, obtained from a data signal included in the demodulated received signal, and correcting an estimated SNR in accordance with a transmission parameter obtained from the received signal.

According to another embodiment of the present disclosure, there is provided a program for causing a computer to function as a device including a demodulator configured to demodulate a received signal that is transmitted via a propagation path and is modulated by a predetermined system prescribed by a predetermined standard, an estimator configured to estimate an SNR relating to the propagation path, obtained from a data signal included in the demodulated received signal, and a corrector configured to correct an estimated SNR in accordance with a transmission parameter obtained from the received signal.

In the demodulating device and method and the program according to the above-described embodiments of the present disclosure, a received signal that is transmitted via the propagation path and is modulated by a predetermined system prescribed by a predetermined standard is demodulated. Furthermore, the SNR relating to the propagation path, obtained from a data signal included in the demodulated received signal, is estimated, and the estimated SNR is corrected in accordance with the transmission parameter obtained from the received signal.

The embodiments of the present disclosure can enhance the accuracy of estimation of the SNR relating to a propagation path.

DETAILED DESCRIPTION OF THE PREFERRED EMBODIMENT

An embodiment of the present disclosure will be described below with reference to the drawings.

[Configuration of Receiving Device]

Figure 4:
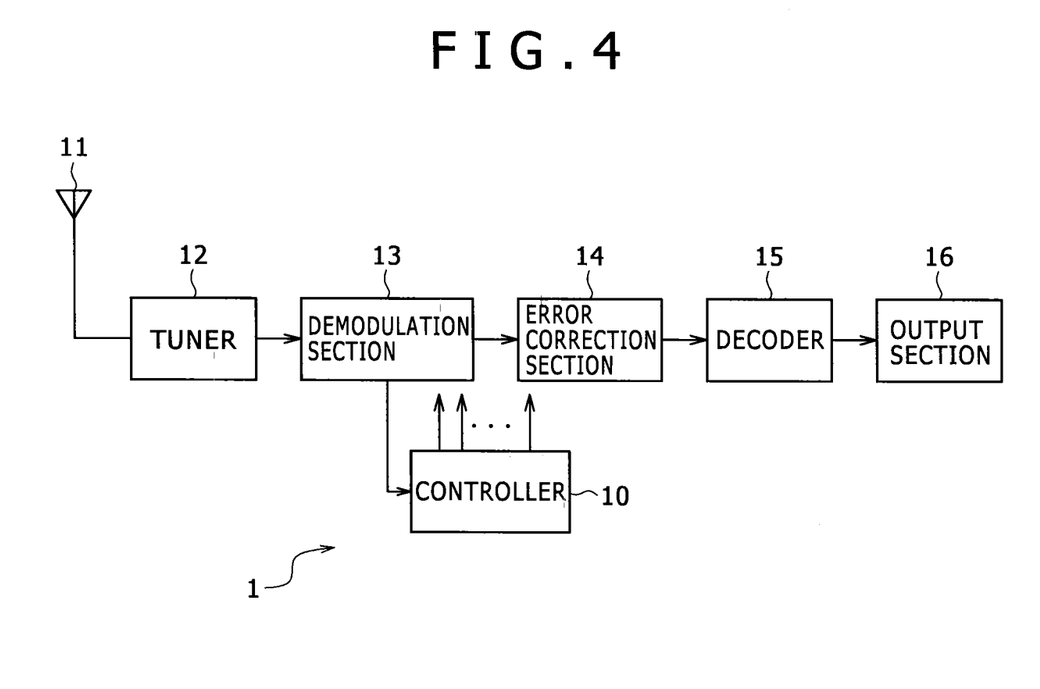
FIG. 4 is a diagram showing the configuration of a receiving device according to one embodiment of the present disclosure.

FIG. 4 is a diagram showing the configuration of a receiving device according to one embodiment of the present disclosure.

A receiving device 1 of FIG. 4 is equivalent to the receiving device 1 in FIG. 1 and is e.g. a receiving device compliant with a predetermined standard of digital terrestrial broadcasting. The receiving device 1 includes an antenna 11, a tuner 12, a demodulating section 13, an error correction section 14, a decoder 15, and an output section 16. Furthermore, the receiving device 1 includes a controller 10 that controls the operation of the respective sections in the receiving device 1.

The antenna 11 receives an RF (Radio Frequency) signal transmitted from the transmitting device 2 of a broadcast station or the like via the propagation path 3 and supplies it to the tuner 12.

The tuner 12 performs frequency conversion of the RF signal received by the antenna 11. An IF (Intermediate Frequency) signal obtained by performing the frequency conversion for the RF signal is supplied to the demodulating section 13.

The demodulating section 13 performs A/D conversion for the signal supplied from the tuner 12 and then executes predetermined demodulation processing such as synchronization processing and equalization processing, to supply data obtained as the result to the error correction section 14.

Furthermore, the demodulating section 13 estimates the SNR relating to the propagation path 3, obtained from a data signal included in the demodulated received signal. Moreover, the demodulating section 13 acquires a transmission parameter obtained from the received signal. The demodulating section 13 supplies the estimated SNR and the transmission parameter to the controller 10.

The transmission parameter is inserted in e.g. system information (SI) of a body part that configures a frame of a predetermined standard together with a header part.

The estimated SNR and the transmission parameter are supplied from the demodulating section 13 to the controller 10. The controller 10 corrects the estimated SNR in accordance with the transmission parameter. Hereinafter, the corrected estimated SNR will be referred to as the corrected SNR. The controller 10 supplies the corrected SNR obtained by correcting the estimated SNR to the respective sections in the receiving device 1 that execute predetermined processing with use of the corrected SNR.

The detailed configurations of the controller 10 and the demodulating section 13 will be described later.

The error correction section 14 executes predetermined error correction processing for data supplied from the demodulating section 13 and supplies encoded data obtained as the result to the decoder 15.

In the transmitting device 2 (FIG. 1), for example data of image and audio as a show is subjected to MPEG (Moving Picture Experts Group) encoding and a transmission signal configured by packets including the MPEG-encoded data is transmitted. Furthermore, in the transmitting device 2, the data is encoded to a code such as an RS (Reed-Solomon) code as a countermeasure against an error occurring on the propagation path 3. Therefore, the error correction section 14 executes processing of decoding the code and so forth as the error correction processing.

The decoder 15 performs e.g. MPEG decoding of the encoded data supplied from the error correction section 14 and supplies data of image and audio obtained as the result to the output section 16.

The output section 16 is configured with display device, speaker, etc. The display device displays an image in association with the image data supplied from the decoder 15 and the speaker outputs audio in association with the audio data.

The receiving device 1 is configured in the above-described manner.

[Detailed Configurations of Controller and Demodulating Section]

Figure 5:
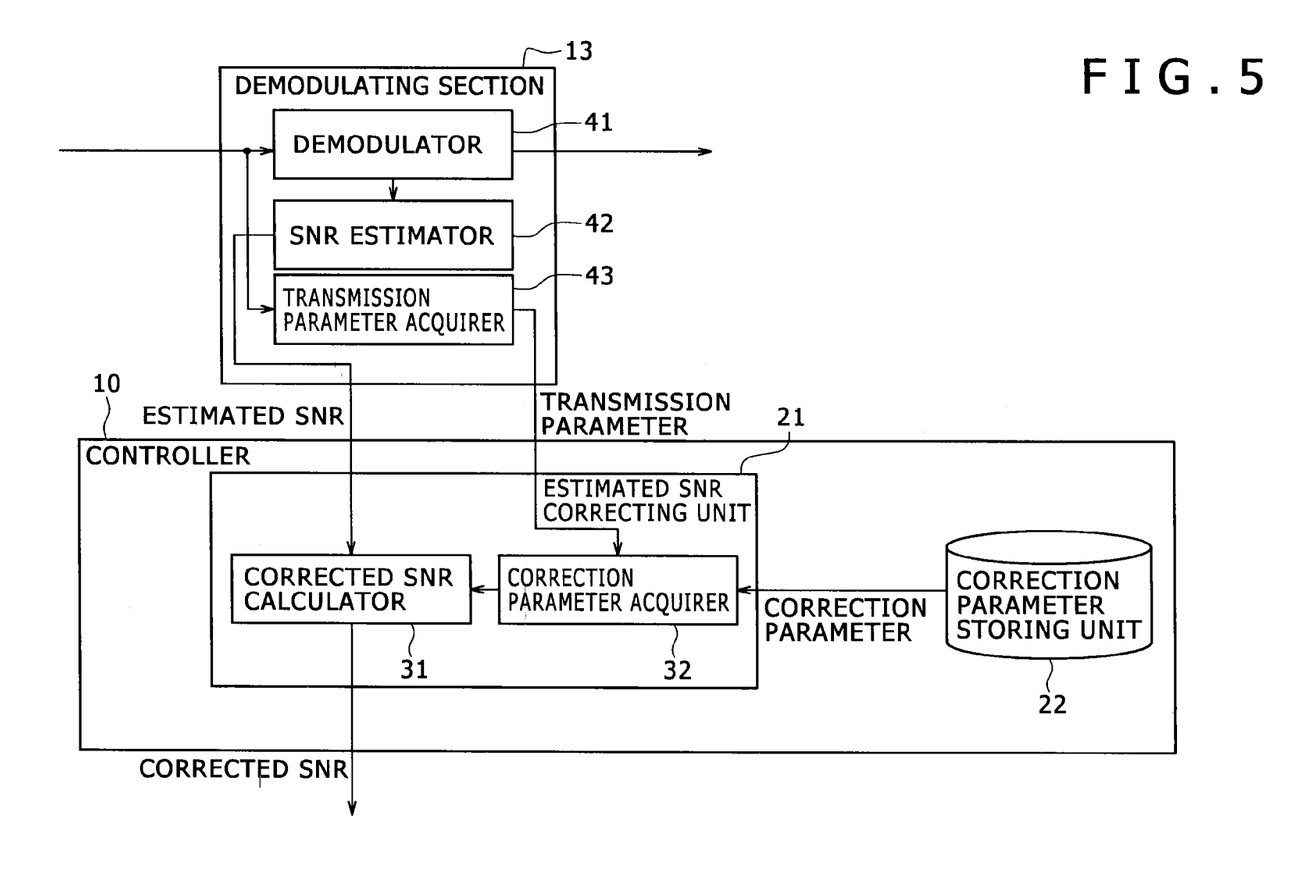
FIG. 5 is a diagram showing the detailed configurations of a controller and a demodulating section.

With reference to FIG. 5, the detailed configurations of the controller 10 and the demodulating section 13 as part of the respective sections configuring the receiving device 1 of FIG. 4 will be described below.

As shown in FIG. 5, the demodulating section 13 includes an SNR estimator 42 and a transmission parameter acquirer 43 in addition to a demodulator 41 that executes demodulation processing.

The SNR estimator 42 estimates the SNR obtained from a data signal included in the received signal demodulated by the demodulating section 13 and supplies the estimated SNR to the controller 10.

As the method for estimating the SNR, the result of a hard decision for the constellation of the data signal is used as described above with FIGS. 3A and 3B, and thereby the estimated SNR is obtained. Therefore, as described above, when the path SNR is not low, the transmission point corresponds with the estimated transmission point and the ideal estimated SNR is obtained. In contrast, when the path SNR is low, the transmission point does not correspond with the estimated transmission point and an erroneous estimated SNR is obtained.

The transmission parameter acquirer 43 extracts the signal corresponding to the system information from the signal obtained by executing equalization processing for the signal supplied from the tuner 12 and decodes the extracted signal to thereby obtain information on the transmission parameter. The transmission parameter acquirer 43 supplies the acquired transmission parameter to the controller 10.

As the transmission parameter, e.g. a constellation is acquired. The constellation is an entity obtained by defining the arrangement of signal points indicating the combination of the phase and/or amplitude of the in-phase channel (I channel) and the quadrature channel (Q channel) in a digital quadrature modulation system such as PSK (Phase Shift Keying) or QAM (Quadrature Amplitude Modulation). Normally the constellation is represented by the IQ plane. Accordingly, e.g. a constellation of 4QAM, 4QAM-NR, 16QAM, 32QAM, or 64QAM is acquired as the transmission parameter.

The transmission parameter may be other than the constellation. For example, another parameter obtained by the demodulation processing by the demodulating section 13, such as the pseudo noise (PN) code length, may be acquired.

The controller 10 includes an estimated SNR correcting unit 21 and a correction parameter storing unit 22.

The correction parameter storing unit 22 stores correction parameters used for correction of the estimated SNR in such a manner that each of the correction parameters is associated with a respective one of the transmission parameters. This transmission parameter is e.g. the constellation or the PN code length as described above and the correction parameter is stored in the correction parameter storing unit 22 in association with the constellation or another parameter.

The estimated SNR correcting unit 21 includes a corrected SNR calculator 31 and a correction parameter acquirer 32.

In the estimated SNR correcting unit 21, the estimated SNR from the SNR estimator 42 is supplied to the corrected SNR calculator 31 and the transmission parameter from the transmission parameter acquirer 43 is supplied to the correction parameter acquirer 32.

The correction parameter acquirer 32 acquires the correction parameter, which is stored in the correction parameter storing unit 22 in association with the transmission parameter on each transmission parameter basis, corresponding to the transmission parameter supplied from the transmission parameter acquirer 43 and supplies the correction parameter to the corrected SNR calculator 31.

The corrected SNR calculator 31 applies the correction parameter supplied from the correction parameter acquirer 32 to a predetermined arithmetic expression and performs calculation with use of this arithmetic expression to thereby calculate the corrected SNR from the estimated SNR. The corrected SNR calculator 31 supplies the corrected SNR obtained by the calculation to the respective sections in the receiving device 1 that execute predetermined processing with use of the corrected SNR.

The controller 10 and the demodulating section 13 are configured in the above-described manner.

[Estimated-SNR-Related Processing]

With reference to a flowchart of FIG. 6, estimated-SNR-related processing executed in the receiving device 1 with use of the estimated SNR will be described below.

When a digital terrestrial broadcast signal is transmitted from the transmitting device 2 via the propagation path 3, the signal is received by the tuner 12 via the antenna 11 in the receiving device 1 (step S11). The tuner 12 performs frequency conversion of the received signal and supplies the resulting signal to the demodulating section 13.

In the demodulating section 13, the SNR estimator 42 estimates the SNR from the result of a hard decision for the constellation of a data signal included in the received signal demodulated by the demodulator 41 (step S12). Furthermore, the transmission parameter acquirer 43 extracts the signal corresponding to the system information from the signal obtained by executing equalization processing for the received signal and decodes the extracted signal to thereby acquire a transmission parameter (step S13).

In a step S14, the estimated SNR correcting unit 21 executes estimated SNR correction processing for correcting the estimated SNR obtained by the SNR estimator 42 in accordance with the transmission parameter acquired by the transmission parameter acquirer 43.

With reference to a flowchart of FIG. 7, details of the estimated SNR correction processing executed by the estimated SNR correcting unit 21 will be described below.

In the estimated SNR correcting unit 21, the corrected SNR calculator 31 acquires the estimated SNR from the SNR estimator 42 and the correction parameter acquirer 32 acquires the transmission parameter from the transmission parameter acquirer 43 (step S31).

In a step S32, the correction parameter acquirer 32 acquires, from the correction parameter storing unit 22, the correction parameter corresponding to the transmission parameter from the transmission parameter acquirer 43.

The corrected SNR calculator 31 compares the value of the subject estimated SNR of the acquired estimated SNR with the correction upper limit (to be described later) included in the correction parameter acquired by the correction parameter acquirer 32 (step S33), and determines whether or not the value of the subject estimated SNR is equal to or lower than the correction upper limit (step S34).

If it is determined in the step S34 that the value of the subject estimated SNR is equal to or lower than the correction upper limit, the processing proceeds to a step S35. In the step S35, the corrected SNR calculator 31 performs calculation with use of a predetermined arithmetic expression to which the correction parameter (the amount of slope correction and the amount of intercept correction to be described later) acquired by the correction parameter acquirer 32, to thereby calculate the corrected SNR about the value of the subject estimated SNR.

Thereafter, the processing returns to the step S33. If the value of the next subject estimated SNR is equal to or lower than the correction upper limit ("Yes" of the step S34), the corrected SNR calculator 31 performs calculation with use of the predetermined arithmetic expression to which the correction parameter is applied, to calculate the corrected SNR about the value of the subject estimated SNR. That is, through the repetition of the steps S33 to S35, the corrected SNR based on the correction parameter is calculated about the values of the estimated SNR equal to or lower than the correction upper limit.

If it is determined in the step S34 that the value of the subject estimated SNR surpasses the correction upper limit, the processing proceeds to a step S36. In the step S36, the corrected SNR calculator 31 outputs, as the corrected SNR, the calculated corrected SNR (corrected SNR calculated in the step S35) for the value of the estimated SNR in the range equal to or lower than the correction upper limit, and the estimated SNR obtained by the SNR estimator 42 as it is for the value of the estimated SNR in the range beyond the correction upper limit.

Figure 8A:
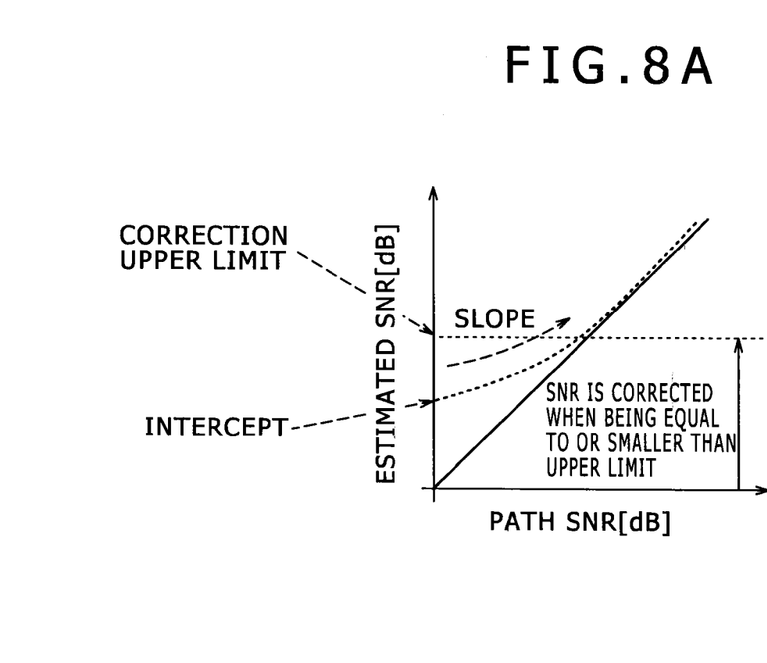
FIGS. 8A and 8B are diagrams showing details of estimated SNR correction.
Figure 8B:
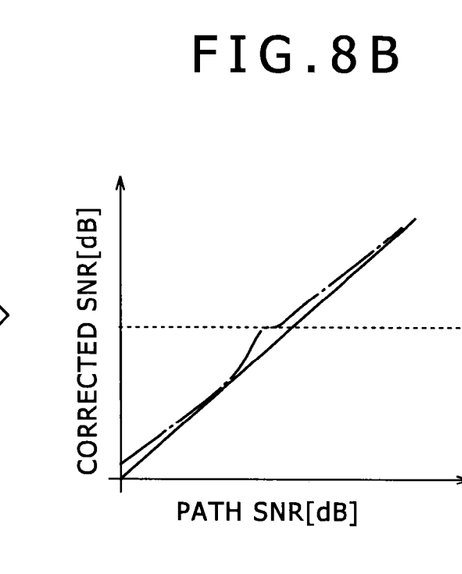
Figure 9:
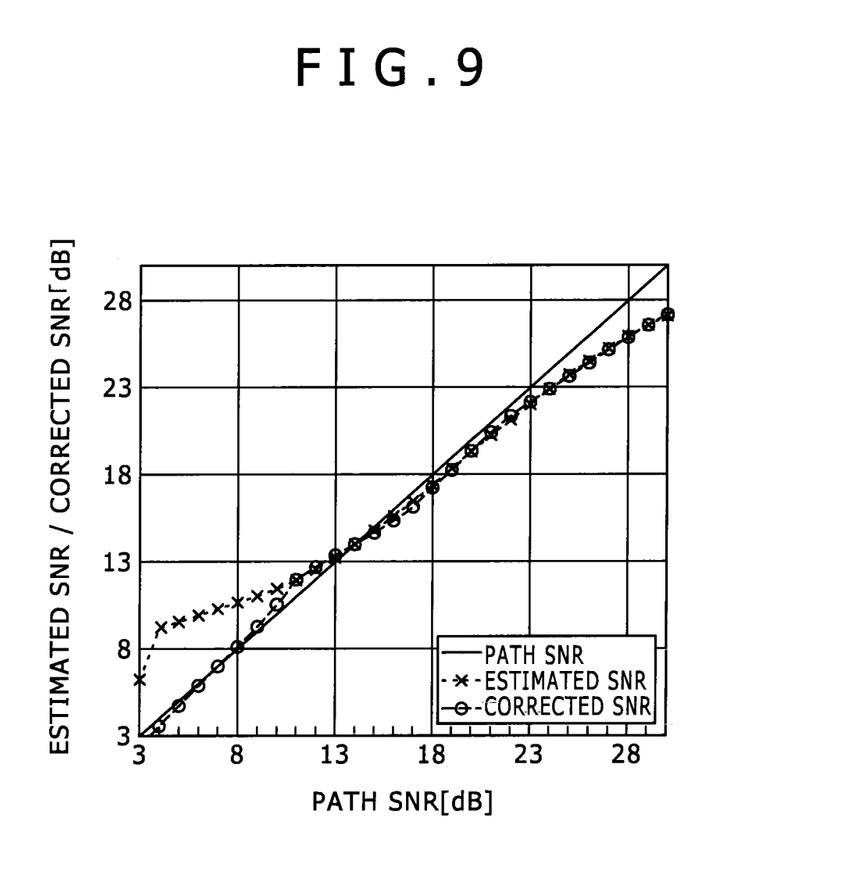
FIG. 9 is a diagram showing the relationship between the path SNR and a corrected SNR.

With reference to FIGS. 8A, 8B and FIG. 9, a specific example of the estimated SNR correction processing executed by the estimated SNR correcting unit 21 will be described below.

FIGS. 8A and 8B are graphs made by representing, on a logarithmic axis, the values of the estimated SNR before and after the estimated SNR correction processing executed by the estimated SNR correcting unit 21. In FIG. 8A on the left side of the diagram, the relationship between the path SNR and the estimated SNR (estimated SNR before the correction processing) is shown. In FIG. 8B on the right side of the diagram, the relationship between the path SNR and the corrected SNR (estimated SNR after the correction processing) is shown.

As shown in FIG. 8A, as the relationship between the estimated SNR indicated by the dashed line and the path SNR (ideal SNR) indicated by the solid line, the estimated SNR is divergent from the path SNR when the value of the SNR is low as described above.

Here, pay attention to the value of the estimated SNR. The estimated SNR is divergent from the path SNR only when the value of the SNR is low. So, the range of the divergence is defined by the correction upper limit and the estimated SNR in the range equal to or lower than the correction upper limit is considered as a linear equation having a slope and an intercept. If such slope and intercept that the above-described divergence is eliminated are given as the amounts of correction about this linear equation, the estimated SNR indicated by the dashed line, i.e. the corrected SNR, substantially overlaps with the path SNR indicated by the solid line as shown in FIG. 8B.

If the intercept and slope of the estimated SNR are so corrected that the corrected SNR has a proportional relationship with the path SNR in this manner, the accuracy of the estimated SNR can be enhanced.

Specifically, by correcting the estimated SNR e.g. by the following correcting methods 1 and 2, the corrected SNR and the path SNR can be made to have a proportional relationship.

[Correcting Method 1]

As correcting method 1, there is a method in which the intercept and slope of the estimated SNR on the logarithmic axis are changed to correct the decibel value of the estimated SNR so that the path SNR and the corrected SNR may be proportional to each other. In this case, the corrected SNR is obtained by the following arithmetic expression (1).

$$x' = \begin{cases} ax + n & (x \leq m) \\ x & (x > m) \end{cases} \quad (1)$$

x' [dB]: corrected SNR
x [dB]: estimated SNR
a: the amount of slope correction
n: the amount of intercept correction
m [dB]: correction upper limit (correction upper limit SNR)

As described above, in correcting method 1, three parameters of the amount a of slope correction, the amount n of intercept correction, and the correction upper limit m are given as the correction parameter associated with the transmission parameter such as the constellation or the PN code length. The corrected SNR(x') is obtained by performing calculation of multiplying the estimated SNR(x) having a decibel value equal to or lower than the correction upper limit m by the amount a of slope correction and then adding the amount n of intercept correction to the value obtained by the multiplication. The corrected SNR(x') obtained in this manner has a proportional relationship with the path SNR. As for the value of the estimated SNR(x) in the range beyond the correction upper limit m, this value of the estimated SNR(x) is used as it is because the value of the estimated SNR(x) is not divergent from the value of the path SNR.

[Correcting Method 2]

As correcting method 2, there is a method in which the intercept and slope of the estimated SNR on the logarithmic axis are changed to correct the true value of the estimated SNR so that the path SNR and the corrected SNR may be proportional to each other. In this case, the corrected SNR is obtained by the following arithmetic expression (2).

$$X' = \begin{cases} NX^A & (X \leq M) \\ X & (X > M) \end{cases} \quad (2)$$

X': corrected SNR
X: estimated SNR
A: the amount of slope correction
N: the amount of intercept correction
M: correction upper limit (correction upper limit SNR)

As described above, in correcting method 2, three parameters of the amount A of slope correction, the amount N of intercept correction, and the correction upper limit M are given as the correction parameter associated with the transmission parameter such as the constellation or the PN code length. The corrected SNR(X') is obtained by performing calculation of raising the estimated SNR(X) having a true value equal to or lower than the correction upper limit M to the power of the amount A of slope correction and then multiplying the value obtained by the raising by the amount N of intercept correction. The corrected SNR(X') obtained in this manner has a proportional relationship with the path SNR. As for the value of the estimated SNR(X) in the range beyond the correction upper limit M, this value of the estimated SNR(X) is used as it is because the value of the estimated SNR(X) is not divergent from the value of the path SNR.

Correcting methods 1 and 2 are one example of the method for correcting the SNR so that the corrected SNR and the path SNR may be proportional to each other, and another correcting method may be used. As for comparison between correcting method 1 and correcting method 2, employing correcting method 1 allows a smaller circuit scale because correcting method 1, in which calculation of multiplication and addition is performed, permits a smaller amount of calculation.

In both correcting methods 1 and 2, the range of the SNR for which correction is performed is defined by the correction upper limit. Due to this feature, the correction processing is executed only for the low-value range of the SNR, in which the phenomenon that the value of the estimated SNR is divergent from the value of the path SNR occurs, and the correction is not performed for the range in which the correction is unnecessary. Thus, the amount of calculation of the correction processing can be decreased and the processing time can be shortened.

FIG. 9 is a diagram showing the relationship among the path SNR, the estimated SNR, and the corrected SNR.

In FIG. 9, the estimated SNR (cross mark in the diagram) and the corrected SNR (circle-mark in the diagram) represented by the axis along the vertical direction in the diagram are indicated by the dashed lines, and the path SNR represented by the axis along the horizontal direction in the diagram is indicated by the solid line. As described above, the value of the estimated SNR is divergent from the value of the path SNR at a higher degree when the value of the SNR is lower. However, as is apparent also from FIG. 9, in the case of the corrected SNR obtained by correcting the estimated SNR, the gap between the values of the SNR is absent even when the value of the SNR is low, and the corrected SNR is close to the ideal path SNR.

In the above-described manner, if the SNR is estimated from the result of a hard decision for the constellation of a data signal, the correction parameter (the amount of slope correction, the amount of intercept correction, correction upper limit) associated with the transmission parameter such as a constellation is acquired in the estimated SNR correcting unit 21. Furthermore, in the estimated SNR correcting unit 21, calculation with the predetermined arithmetic expression (arithmetic expression (1), (2)) to which the amount of slope correction and the amount of intercept correction are applied is performed only for the values of the estimated SNR in the range equal to or lower than the correction upper limit and the corrected SNR arising from approximation of the value of the estimated SNR to the value of the path SNR is calculated.

Figure 6:
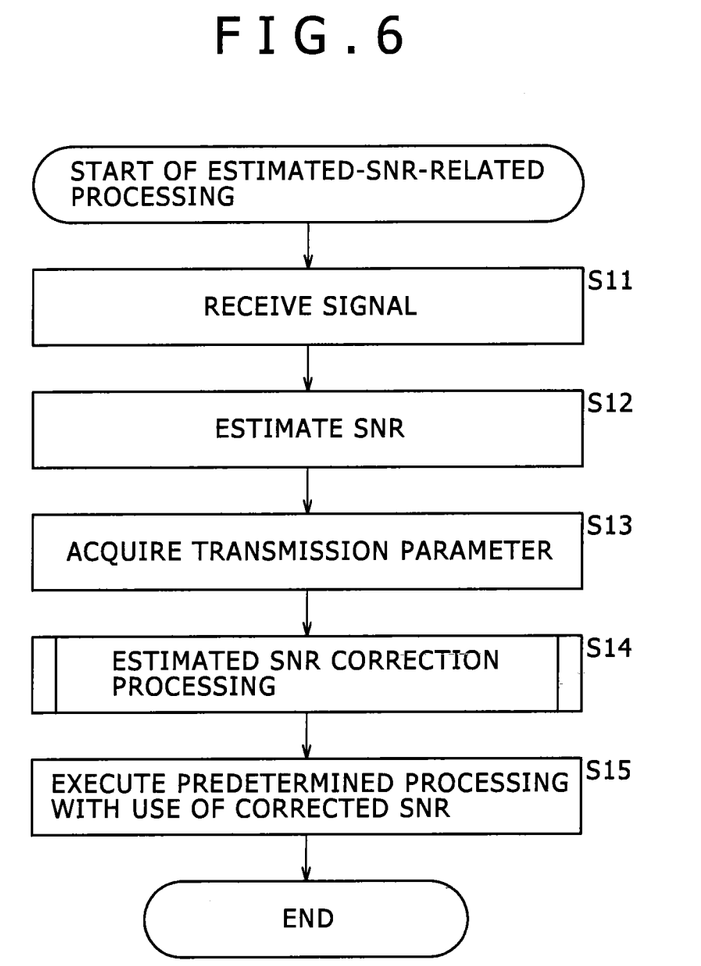
FIG. 6 is a flowchart showing estimated-SNR-related processing.
Figure 7:
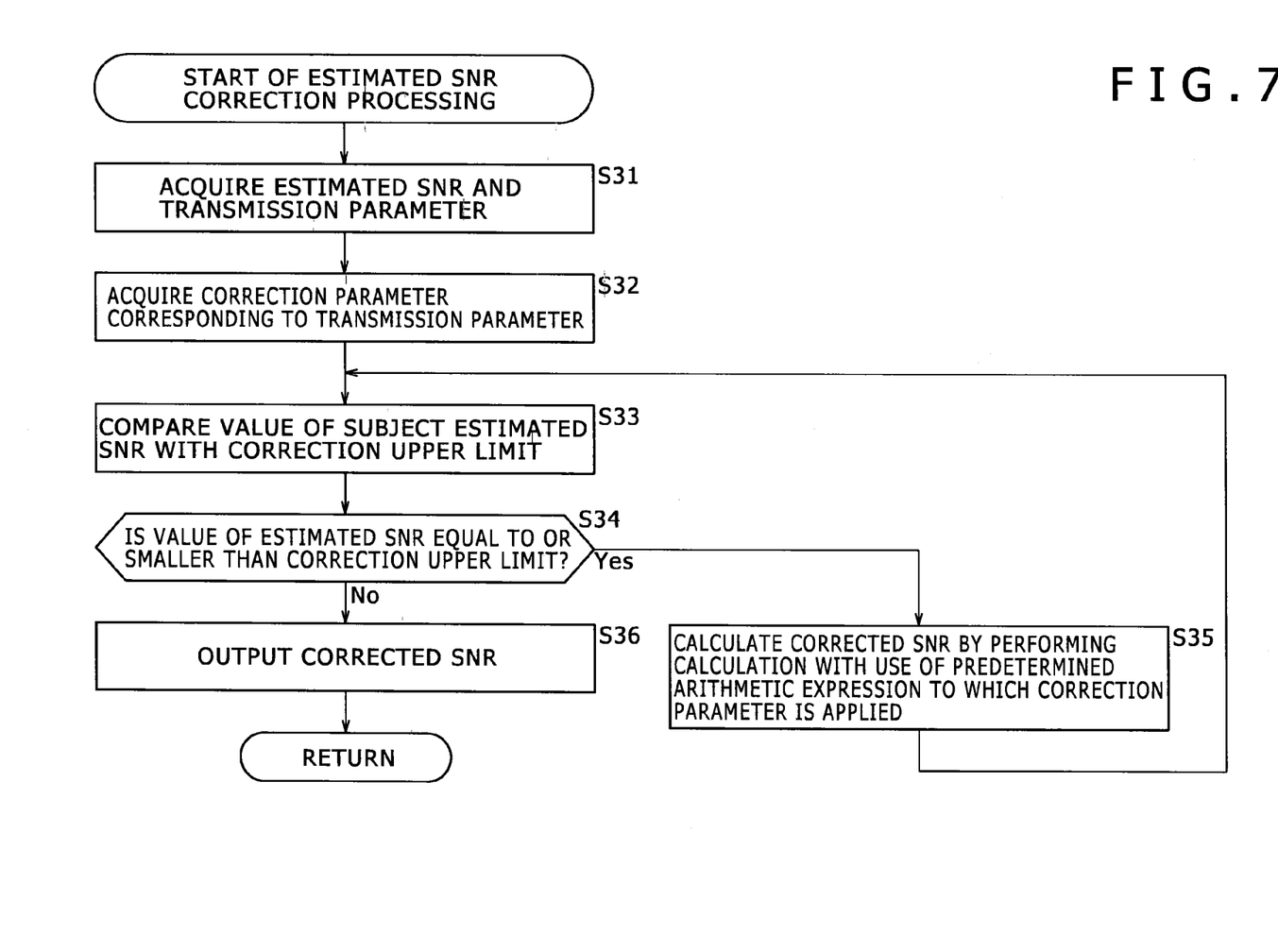
FIG. 7 is a flowchart showing estimated SNR correction processing.

Referring back to the flowchart of FIG. 7, the corrected SNR is output by the corrected SNR calculator 31 to the demodulating section 13 and another subsequent-stage processing unit (not shown) that executes predetermined processing with use of the corrected SNR (step S36). Upon the end of the step S36, the processing returns to the flowchart of FIG. 6 and processing of a step S15 is executed.

In the step S15, the demodulating section 13 and the subsequent-stage processing unit (not shown) execute predetermined processing with use of the corrected SNR, so that the estimated-SNR-related processing of FIG. 6 is ended. For example, the subsequent-stage processing unit (not shown) supplies the corrected SNR to the output section 16 and makes the corrected SNR be displayed on a display.

As described above, the estimated SNR with high accuracy can be acquired by executing the estimated SNR correction processing for the estimated SNR by the corrected SNR calculator 31. Thus, for example if the result of estimation of the SNR is used inside the receiving device 1, the estimated-SNR-related processing with use of the estimated SNR having higher accuracy can be executed. Furthermore, the high-accuracy result of estimation of the SNR can be presented to the user who uses the receiving device 1.

In the above description of the present embodiment, the estimated SNR correcting unit 21 to execute processing of correcting the estimated SNR and the correction parameter storing unit 22 are part of the controller 10. However, the estimated SNR correcting unit 21 and the correction parameter storing unit 22 may be considered as part of the demodulating section 13. That is, it is also possible that the demodulating section 13 of the above-described present embodiment is configured as a demodulating device (demodulating LSI (Large Scale Integration)) obtained by adding the estimated SNR correcting unit 21 to execute processing of correcting the estimated SNR and the correction parameter storing unit 22 to the demodulating section 13. This demodulating device may include the error correction section 14, an A/D converter (not shown), and so forth.

As the standard of the digital terrestrial broadcasting of the present embodiment, e.g. a standard such as the DTMB (Digital Terrestrial Multimedia Broadcast) is employed.

[Description of Computer to which Embodiment of the Present Disclosure is Applied]

The above-described series of processing can be executed by hardware and also by software. In the case of executing the series of processing by software, a program configuring the software is installed from a program recording medium into a computer incorporated into dedicated hardware or e.g. a general-purpose personal computer capable of executing various kinds of functions through installation of various kinds of programs.

Figure 10:
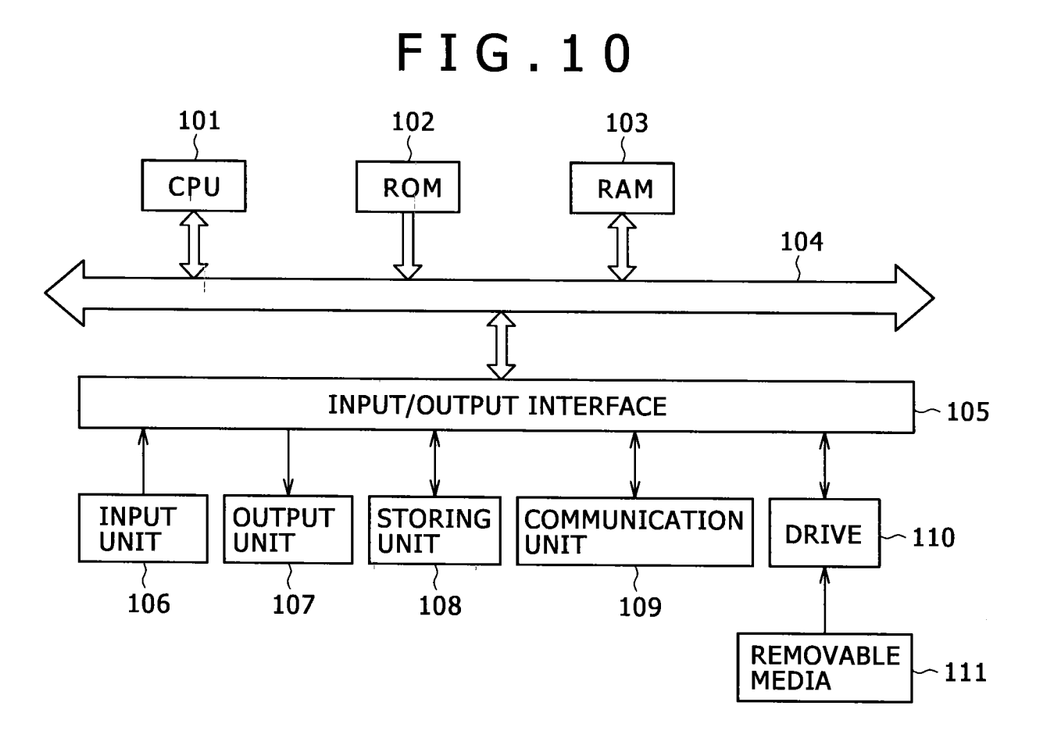
FIG. 10 is a diagram showing a configuration example of hardware of a computer.

FIG. 10 is a diagram showing a configuration example of a computer that executes the above-described series of processing by a program.

In this computer 100, a CPU (central processing unit) 101, a ROM (read only memory) 102, and a RAM (random access memory) 103 are connected to each other by a bus 104.

An input/output interface 105 is connected to the bus 104. The following units are connected to the input/output interface 105: an input unit 106 composed of a keyboard, a mouse, a microphone, etc; an output unit 107 composed of a display, a speaker, etc; a storing unit 108 composed of a hard disc, a non-volatile memory, etc; a communication unit 109 composed of a network interface, etc; and a drive 110 that drives removable media 111 such as a magnetic disc, an optical disc, a magneto-optical disc, or a semiconductor memory.

In the computer 100 having the above-described configuration, for example the CPU 101 loads a program stored in the storing unit 108 into the RAM 103 via the input/output interface 105 and the bus 104 and runs the program, and thereby the above-described series of processing is executed.

Steps that describe the program run by the computer encompass processing that is not necessarily executed in a time-series manner but executed in parallel or individually as well as processing executed in a time-series manner along the described order.

Embodiments of the present disclosure are not limited to the above-described embodiment and various changes may be made without departing from the gist of the present disclosure.

The present disclosure contains subject matter related to that disclosed in Japanese Priority Patent Application JP 2010-238638 filed in the Japan Patent Office on Oct. 25, 2010, the entire content of which is hereby incorporated by reference.

What is claimed is:

1. A receiving device comprising:
a receiver configured to receive a signal that is transmitted via a propagation path and is modulated by a predetermined system prescribed by a predetermined standard;
a demodulator configured to demodulate the received signal;
an estimator configured to estimate a signal-to-noise ratio relating to the propagation path, obtained from a data signal included in the demodulated received signal;
a corrector configured to correct the estimated signal-to-noise ratio in accordance with a transmission parameter obtained from the received signal; and
an acquirer configured to acquire a correction parameter that is associated with the transmission parameter on each transmission parameter basis and is used for correction of the estimated signal-to-noise ratio, wherein the corrector performs predetermined calculation with use of the acquired correction parameter to approximate a value of the estimated signal-to-noise ratio to a value of a path signal-to-noise ratio of the propagation path, wherein the correction parameter includes a first variable indicating the amount of correction of a slope of the estimated signal-to-noise ratio on a logarithmic axis of the path signal-to-noise ratio and the estimated signal-to-noise ratio, and a second variable indicating the amount of correction of an intercept of the estimated signal-to-noise ratio, and the corrector performs second calculation of multiplying, by the second variable, a value obtained by raising the estimated signal-to-noise ratio as a true value to the power of the first variable, to correct the estimated signal-to-noise ratio so that the path signal-to-noise ratio and the estimated signal-to-noise ratio have a proportional relationship.

2. The receiving device according to claim 1, wherein
the corrector performs first calculation of adding the second variable to a value obtained by multiplying the estimated signal-to-noise ratio as a decibel value by the first variable, to correct the estimated signal-to-noise ratio so that the path signal-to-noise ratio and the estimated signal-to-noise ratio have a proportional relationship.

3. The receiving device according to claim 2, wherein
the correction parameter further includes a third variable defining a correction upper limit on the logarithmic axis of the path signal-to-noise ratio and the estimated signal-to-noise ratio, and
the corrector performs the first calculation only for the estimated signal-to-noise ratio equal to or lower than the correction upper limit indicated by the third variable.

4. The receiving device according to claim 1, wherein
the correction parameter further includes a third variable defining a correction upper limit on the logarithmic axis of the path signal-to-noise ratio and the estimated signal-to-noise ratio, and
the corrector performs the second calculation only for the estimated signal-to-noise ratio equal to or lower than the correction upper limit indicated by the third variable.

5. The receiving device according to claim 1, wherein
the transmission parameter includes information relating to a constellation or a pseudo noise code length, and
the estimator estimates the signal-to-noise ratio from a result of a hard decision for a constellation of the data signal.

6. A receiving method of a receiving device, the method comprising:
receiving a signal that is transmitted via a propagation path and is modulated by a predetermined system prescribed by a predetermined standard;
demodulating the received signal;
estimating a signal-to-noise ratio relating to the propagation path, obtained from a data signal included in the demodulated received signal;
correcting the estimated signal-to-noise ratio in accordance with a transmission parameter obtained from the received signal; and
acquiring a correction parameter that is associated with the transmission parameter on each transmission parameter basis and using for correction of the estimated signal-to-noise ratio, wherein a corrector performs predetermined calculation with use of the acquired correction parameter to approximate a value of the estimated signal-to-noise ratio to a value of a path signal-to-noise ratio of the propagation path, wherein the correction parameter includes a first variable indicating the amount of correction of a slope of the estimated signal-to-noise ratio on a logarithmic axis of the path signal-to-noise ratio and the estimated signal-to-noise ratio, and a second variable indicating the amount of correction of an intercept of the estimated signal-to-noise ratio, and the corrector performs second calculation of multiplying, by the second variable, a value obtained by raising the estimated signal-to-noise ratio to the power of the first variable, to correct the estimated signal-to-noise ratio so that the path signal-to-noise ratio and the estimated signal-to-noise ratio have a proportional relationship.

7. A non-transitory computer-readable storage medium having stored thereon, a computer program having at least one code section for communication, the at least one code section being executable by a device for causing the device to perform steps comprising:
in a receiver:
receiving a signal that is transmitted via a propagation path and is modulated by a predetermined system prescribed by a predetermined standard;
demodulating the received signal;
estimating a signal-to-noise ratio relating to the propagation path, obtained from a data signal included in the demodulated received signal;
correcting the estimated signal-to-noise ratio in accordance with a transmission parameter obtained from the received signal; and
acquiring a correction parameter that is associated with the transmission parameter on each transmission parameter basis and using for correction of the estimated signal-to-noise ratio, wherein a corrector performs predetermined calculation with use of the acquired correction parameter to approximate a value of the estimated signal-to-noise ratio to a value of a path signal-to-noise ratio of the propagation path, wherein the correction parameter includes a first variable indicating the amount of correction of a slope of the estimated signal-to-noise ratio on a logarithmic axis of the path signal-to-noise ratio and the estimated signal-to-noise ratio, and a second variable indicating the amount of correction of an intercept of the estimated signal-to-noise ratio, and the corrector performs second calculation of multiplying, by the second variable, a value obtained by raising the estimated signal-to-noise ratio to the power of the first variable, to correct the estimated signal-to-noise ratio so that the path signal-to-noise ratio and the estimated signal-to-noise ratio have a proportional relationship.

8. A demodulating device comprising:
a demodulator configured to demodulate a received signal that is transmitted via a propagation path and is modulated by a predetermined system prescribed by a predetermined standard;
an estimator configured to estimate a signal-to-noise ratio relating to the propagation path, obtained from a data signal included in the demodulated received signal;
a corrector configured to correct the estimated signal-to-noise ratio in accordance with a transmission parameter obtained from the received signal; and
an acquirer configured to acquire a correction parameter that is associated with the transmission parameter on each transmission parameter basis and is used for correction of the estimated signal-to-noise ratio, wherein the corrector performs predetermined calculation with use of the acquired correction parameter to approximate a value of the estimated signal-to-noise ratio to a value of a path signal-to-noise ratio of the propagation path, wherein the correction parameter includes a first variable indicating the amount of correction of a slope of the estimated signal-to-noise ratio on a logarithmic axis of the path signal-to-noise ratio and the estimated signal-to-noise ratio, and a second variable indicating the amount of correction of an intercept of the estimated signal-to-noise ratio, and the corrector performs second calculation of multiplying, by the second variable, a value obtained by raising the estimated signal-to-noise ratio as a true value to the power of the first variable, to correct the estimated signal-to-noise ratio so that the path signal-to-noise ratio and the estimated signal-to-noise ratio have a proportional relationship.

9. The demodulating device according to claim 8, wherein the corrector performs first calculation of adding the second variable to a value obtained by multiplying the estimated signal-to-noise ratio as a decibel value by the first variable, to correct the estimated signal-to-noise ratio so that the path signal-to-noise ratio and the estimated signal-to-noise ratio have a proportional relationship.

10. The demodulating device according to claim 9, wherein the correction parameter further includes a third variable defining a correction upper limit on the logarithmic axis of the path signal-to-noise ratio and the estimated signal-to-noise ratio, and
the corrector performs the first calculation only for the estimated signal-to-noise ratio equal to or lower than the correction upper limit indicated by the third variable.

11. The demodulating device according to claim 8, wherein the correction parameter further includes a third variable defining a correction upper limit on the logarithmic axis of the path signal-to-noise ratio and the estimated signal-to-noise ratio, and
the corrector performs the second calculation only for the estimated signal-to-noise ratio equal to or lower than the correction upper limit indicated by the third variable.

12. The demodulating device according to claim 8, wherein the transmission parameter includes information relating to a constellation or a pseudo noise code length, and
the estimator estimates the signal-to-noise ratio from a result of a hard decision for a constellation of the data signal.

13. A demodulating method of a demodulating device, the method comprising:
demodulating a received signal that is transmitted via a propagation path and is modulated by a predetermined system prescribed by a predetermined standard;
estimating a signal-to-noise ratio relating to the propagation path, obtained from a data signal included in the demodulated received signal; and
correcting the estimated signal-to-noise ratio in accordance with a transmission parameter obtained from the received signal; and
acquiring a correction parameter that is associated with the transmission parameter on each transmission parameter basis and is used for correction of the estimated signal-to-noise ratio, wherein a corrector performs predetermined calculation with use of the acquired correction parameter to approximate a value of the estimated signal-to-noise ratio to a value of a path signal-to-noise ratio of the propagation path, wherein the correction parameter includes a first variable indicating the amount of correction of a slope of the estimated signal-to-noise ratio on a logarithmic axis of the path signal-to-noise ratio and the estimated signal-to-noise ratio, and a second variable indicating the amount of correction of an intercept of the estimated signal-to-noise ratio, and the corrector performs second calculation of multiplying, by the second variable, a value obtained by raising an estimated signal-to-noise ratio to the power of the first variable, to correct the estimated signal-to-noise ratio so that the path signal-to-noise ratio and the estimated signal-to-noise ratio have a proportional relationship.

14. A non-transitory computer-readable storage medium having stored thereon, a computer program having at least one code section for communication, the at least one code section being executable by a device for causing the device to perform steps comprising:
demodulating a received signal that is transmitted via a propagation path and is modulated by a predetermined system prescribed by a predetermined standard;
estimating a signal-to-noise ratio relating to the propagation path, obtained from a data signal included in the demodulated received signal; and
correcting the estimated signal-to-noise ratio in accordance with a transmission parameter obtained from the received signal; and
acquiring a correction parameter that is associated with the transmission parameter on each transmission parameter basis and is used for correction of the estimated signal-to-noise ratio, wherein a corrector performs predetermined calculation with use of the acquired correction parameter to approximate a value of the estimated signal-to-noise ratio to a value of a path signal-to-noise ratio of the propagation path, wherein the correction parameter includes a first variable indicating the amount of correction of a slope of the estimated signal-to-noise ratio on a logarithmic axis of the path signal-to-noise ratio and the estimated signal-to-noise ratio, and a second variable indicating the amount of correction of an intercept of the estimated signal-to-noise ratio, and the corrector performs second calculation of multiplying, by the second variable, a value obtained by raising an estimated signal-to-noise ratio to the power of the first variable, to correct the estimated signal-to-noise ratio so that the path signal-to-noise ratio and the estimated signal-to-noise ratio have a proportional relationship.

15. The non-transitory computer-readable storage medium according to claim 14, further comprising performing first calculation of adding the second variable to a value obtained by multiplying the estimated signal-to-noise ratio as a decibel value by the first variable, to correct the estimated signal-to-noise ratio so that the path signal-to-noise ratio and the estimated signal-to-noise ratio have a proportional relationship.

16. The demodulating method according to claim 13, further comprising performing first calculation of adding the second variable to a value obtained by multiplying the estimated signal-to-noise ratio as a decibel value by the first variable, to correct the estimated signal-to-noise ratio so that the path signal-to-noise ratio and the estimated signal-to-noise ratio have a proportional relationship.

\* \* \* \* \*